United States Patent Office 2,917,557
Patented Dec. 15, 1959

2,917,557
PRODUCTION OF A TETRACHLOROTETRA-FLUOROBUTENE

Robert A. Stowe, Ludington, and Eric R. Larsen, Midland, Mich., assignors to The Dow Chemical Company, Midland, Mich., a corporation of Delaware No Drawing. Application July 10, 1958
Serial No. 747,599

2 Claims. (Cl. 260—653.3)

This invention relates to the preparation of a tetrachlorotetrafluorobutene and is more particularly concerned with a process for the preparation of 1,3,4,4-tetrachloro-1,2 3,4-tetrafluorobutene-1 by a catalysis-promoted dimerization of 1,2-dichloro-1,2-difluoroethene. Methods for the condensation of 1,2-dichloro-1,2-difluoroethene with itself have usually required a relatively high temperature with a relatively long heating period to obtain a relatively impure product causing substantial difficulties in the separation of the desired 1,3,4,4-tetrachloro-1,2,3,4-tetrafluorobutene-1 from the reaction mixture.

It has now unexpectedly been found that if a catalytic quantity of chlorine is introduced into a reaction zone containing 1,2-dichloro-1,2-difluoroethene heated above a temperature of 150° C. and under the autogenous pressure of the ethene at this temperature, a product relatively free of disproportionation materials is achieved. The introduction of catalytic quantities of chlorine usually causes a rapid pressure rise which then gradually falls off during the reaction period.

While a minimum temperature of about 150° C. is operative, temperatures below about 265° C. are usually employed to avoid thermal rearrangement or extensive decomposition of the reactants and reaction products. However, the preferred temperature is between 235 and 245° C. The amount of chlorine catalyst to be introduced is a catalytic quantity, and can readily be determined by observing the autogenous pressure of the reaction mixture on the introduction of the chlorine. A rapid rise in pressure will occur when a catalytic quantity has been introduced.

Separation of the reaction products is readily accomplished by cooling the reaction effluent, thereby liquifying the tetrachlorotetrafluorobutene so as to be collectable from the unreacted dichlorodifluoroethene.

The following examples are given to illustrate the process of the present invention, but are not to be construed as limiting the invention thereto.

Example 1

A 300 milliliter stainless steel high pressure reaction vessel was charged with 154 grams (1.2 moles) of 1,2-dichloro-1,2-difluoroethene and heated to a temperature of 240° C. (the pressure was 950 lbs. per square inch, gage) while shaking in a reciprocal shaker. When a temperature of 240° C. was reached, a small valve was opened momentarily to a small cylinder of chlorine which was heated to obtain a pressure sufficient to cause the chlorine to flow into the reaction vessel. The pressure rose rapidly from 950 p.s.i.g. to 1225 p.s.i.g. and then slowly decreased to about 600 p.s.i.g. over the next three hours. Thereafter, the reaction products were removed from the reaction vessel and an analysis made by vapor phase chromatography. The results of the vapor phase chromatographic analysis are noted in the following table at I.

Example 2

The above procedure was repeated, except that the reaction vessel containing dichloro-difluoroethene was heated to 265° C. but no chlorine was introduced. The pressure rose gradually to about 2300 p.s.i.g. and thereafter dropped to 600 p.s.i.g. in about three hours. The reaction effluent was analyzed by vapor phase chromatography and the results of this analysis are shown in the following table at II.

Example 3

The procedure of Example 2 was repeated, except that the temperature was maintained at 240° C. and maintained at this temperature for 5.5 hours. The maximum pressure achieved was 750 p.s.i.g. which dropped to 700 p.s.i.g. during the fifth hour. Chromatographic analysis of the product gave the results shown in the following table at III.

| Sample | CFCl=CFCl | B | C | D | E | F | $C_4F_4Cl_4$ |
|---|---|---|---|---|---|---|---|
| I | 36 | | | 0.26 | 0.26 | | 2.1 | 61 |
| II | 6.5 | 0.25 | 0.75 | 1.0 | | 3.7 | 5.5 | 78 |
| III | 98.5 | | | | | | | 1.5 |

Compounds B, C, D, E, and F are materials other than CFCl=CFCl or $C_4F_4Cl_4$.

The above vapor phase chromatography analysis shows that substantially no disproportionation products are present using the process of the present invention, whereas substantial disproportionation occurs utilizing the uncatalyzed reaction, as shown in Example 2, or, as shown in Example 3, illustrates the substantially incomplete reaction which occurs where a lower temperature without a catalyst is employed.

Various modifications may be made in the present invention without departing from the spirit or scope thereof and it is to be understood that we limit ourselves only as defined in the appended claims.

We claim:

1. A process for the preparation of 1,3,4,4-tetrachloro-1,2,3,4-tetrafluorobutene-1 which comprises: heating, under autogenous pressure, 1,2-dichloro-1,2-difluoroethene at a temperature from about 150 to about 265° C. and in the presence of a catalytic quantity of chlorine, and, separating 1,3,4,4-tetrachloro-1,2,3,4-tetrafluorobutene-1 from the reaction mixture.

2. A process for the preparation of 1,3,4,4-tetrachloro-1,2,3,4-tetrafluorobutene-1 which comprises: heating, under autogenous pressure, 1,2-dichloro-1,2-difluoroethene at a temperature between 235 and 245° C. in the presence of a catalytic quantity of chlorine, and, separating 1,3,4,4-tetrachloro-1,2,3,4-tetrafluorobutene-1 from the reaction mixture.

References Cited in the file of this patent
UNITED STATES PATENTS
2,705,229 Ruh et al. _____ Mar. 29, 1955